United States Patent
Hwang et al.

(10) Patent No.: US 6,441,683 B1
(45) Date of Patent: Aug. 27, 2002

(54) DEVICE AND METHOD FOR RECOVERING FREQUENCY REDUNDANT DATA IN A NETWORK COMMUNICATIONS RECEIVER

(75) Inventors: Chien-Meen Hwang; Eugen Gershon, both of San Jose, CA (US)

(73) Assignee: Advanced Micro Devices, Inc, Sunnyvale, CA (US)

( * ) Notice: Subject to any disclaimer, the term of this patent is extended or adjusted under 35 U.S.C. 154(b) by 0 days.

(21) Appl. No.: 09/897,198

(22) Filed: Jul. 2, 2001

Related U.S. Application Data

(60) Provisional application No. 60/225,560, filed on Aug. 16, 2000.

(51) Int. Cl.$^7$ ............................................. H04L 27/22
(52) U.S. Cl. ..................... 329/306; 329/304; 329/348
(58) Field of Search ............................. 329/304, 306, 329/317, 348; 375/229, 272

(56) References Cited

U.S. PATENT DOCUMENTS 5,864,585 A * 1/1999 Erisman ..................... 375/272
5,872,815 A * 2/1999 Strolle et al. ................ 375/321
6,249,180 B1 * 6/2001 Maalej et al. ................ 329/304

\* cited by examiner

Primary Examiner—Tuan T. Lam
Assistant Examiner—Hiep Nguyen
(74) Attorney, Agent, or Firm—Renner, Otto, Boisselle & Sklar

(57) ABSTRACT

A demodulation circuit for recovering frequency redundant quadrature amplitude modulated data comprises an A/D converter generating digitized carrier signal. A mixer receives the digitized carrier and generates a frequency shifted I-signal and a frequency shifted Q-signal. A bank of filters includes a narrow band filter centered at each one of a plurality frequency shifted sub-spectra to generate a digital data signal for each sub-spectrum. A selection circuit determines which one of the sub-spectrum data signals is the strongest and a receiver circuit recovers the transmitted data in response to the strongest sub spectrum data signal.

16 Claims, 4 Drawing Sheets

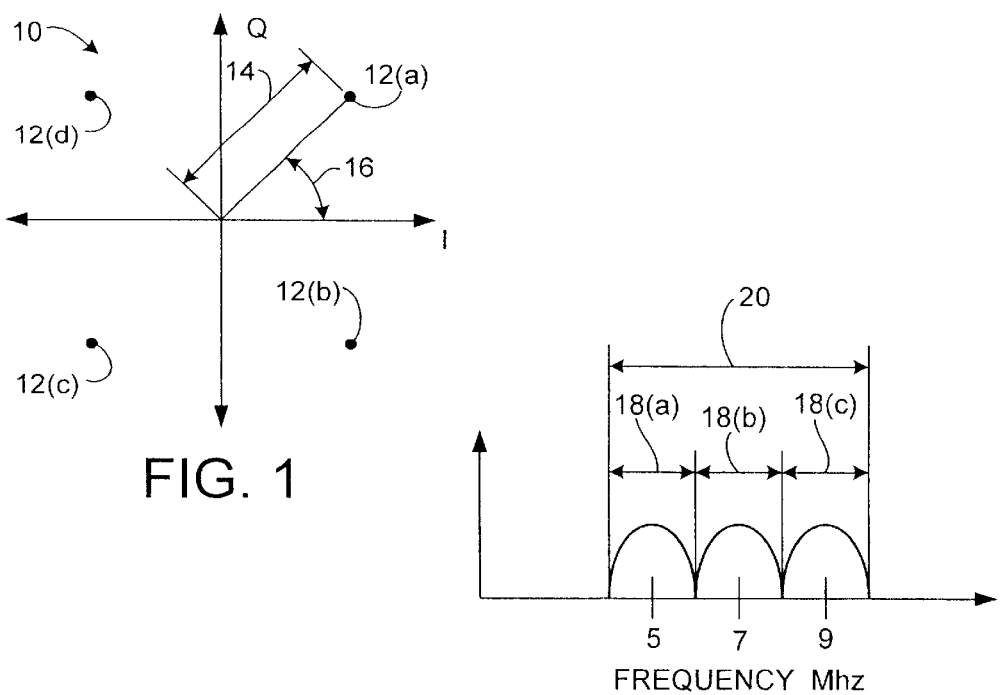
FIG. 1
FIG. 2
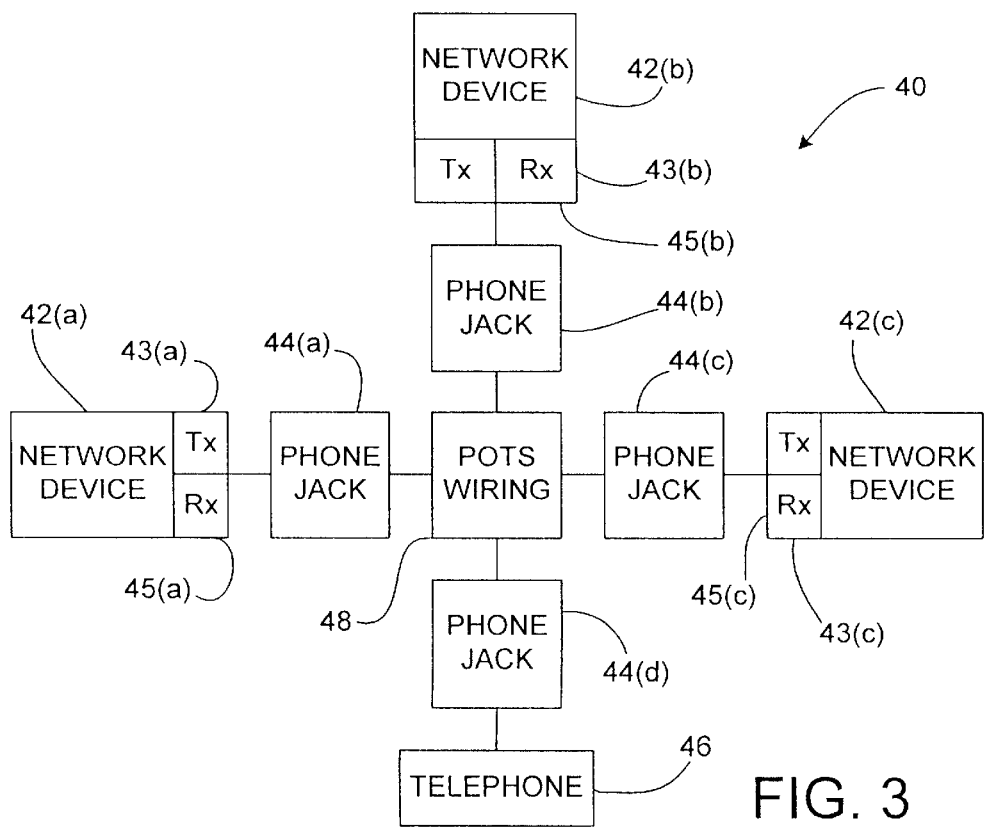
FIG. 3 ion No. 60/225,560 filed Aug. 16, 2000.
DEVICE AND METHOD FOR RECOVERING FREQUENCY REDUNDANT DATA IN A NETWORK COMMUNICATIONS RECEIVER This application claims the benefit of provisional application No. 60/225,560 filed Aug. 16, 2000.

TECHNICAL FIELD

The present invention relates generally to network interfacing, and more particularly, to a method for recovering frequency redundant data in a network communications receiver.

BACKGROUND OF THE INVENTION

The transmission of various types of digital data between computers continues to grow in importance. The predominant method of transmitting such digital data includes coding the digital data into a low frequency baseband data signal and modulating the baseband data signal onto a high frequency carrier signal. The high frequency carrier signal is then transmitted across a network physical transmission medium such as electrical cable, fiber optic, RF, or other medium to a remote computing station.

At the remote computing station, the high frequency carrier signal must be received and demodulated to recover the original baseband signal. In the absence of any distortion across the network medium, the received signal would be identical in phase, amplitude, and frequency to the transmitted carrier and could be demodulated using known mixing techniques to recover the baseband signal. The baseband signal could then be recovered into digital data using known sampling algorithms.

One problem with such networks is that the physical medium and network topology tend to distort the high frequency carrier signal. Branch connections and different lengths of such branches cause reflections of the transmitted signal. Such problems are even more apparent in a network which uses home telephone wiring cables as the network physical medium. The typical wiring of the telephone network is designed for the "plain old telephone service" (POTS) signals in the 0.3–3.4 kilohertz frequency and are not designed for transmission of high frequency carrier signals in a frequency range greater than 1 MHz. The high frequency carrier signal is also distorted by transients in wiring characteristics due to on-hook and off-hook switching and noise pulses of the POTS (e.g. ringing). The high frequency carrier is further distorted by spurious noise caused by electrical devices operating in close proximity to the "cable" medium.

Such distortion of frequency, amplitude, and phase of the high frequency carrier signal degrades network performance and tends to impede the design of higher data rate networks. Known techniques for compensating for such distortion and improving the data rate of a network include complex modulation schemes and frequency diversity.

Utilizing a complex modulation scheme such as quadrature amplitude modulation (QAM), both the amplitude and phase of the high frequency carrier are modulated to represent in-phase (I) and quadrature (Q) components of a baseband signal. Referring to FIG. 1, a 4-QAM modulation constellation 10 is shown. In operation, each data symbol is represented by an I-value of+1 or–1 and a Q-value of+1 or–1 such that the data symbol can be represented by one of the four states 12(a)–12(d) in constellation 10. Each constellation point 12(a) –12(d) represents a unique combination of carrier amplitude and phase. For example, constellation point 12(a) represents a carrier amplitude of 14 and a carrier phase 16.

FIG. 2 illustrates the utilization of frequency diversity by transmitting the same data in three mutually exclusive sub-spectra 18(a)–18(c) of the transmission band 20. Therefore, if a portion of the band is distorted (e.g. one or more of the sub-spectra 18(a)–18(c)), the data may still be recovered at the receiver from a less distorted portion of the sub-spectra 18(a)–18(c). For example, a data signal modulated onto a 7 MHz carrier utilizing 6 MHz of bandwidth may include three mutually exclusive sub-bands 18(a)–18(c) centered at 5 MHz, 7 MHz and 9 MHz.

One approach to demodulating complex signals is to use filters implemented by digital signal processing (DSP), which provides for a convenient way of varying filter coefficients for each transmission to accommodate carrier distortion as detected in the particular time frame in which the data is being transmitted. Using such approach, an equalizer in the receiver compares the distorted received signal representing a known preamble transmission (prior to the data transmission) to the undistorted waveform of the preamble and determines the appropriate filter coefficients for recovery of the received signal. Such filter coefficients are then used for receiving the data transmission.

In accordance with DSP technology, the high frequency carrier is typically sampled with an A/D converter at a rate that is at least 4 times that of the carrier frequency. Assuming a carrier frequency on the order of 7 MHz, the sampling rate will be on the order of 30 MHz. A problem associated with processing digital samples at such rates to demodulate a complex modulated carrier, and to process mutually exclusive sub-bands of a frequency diverse system, is that very large and costly DSPs would be required.

More specifically, a typical receiver used for demodulating a complex modulated carrier in a noisy environment includes an equalizer and a slicer digitally implemented. The equalizer includes various filters with adaptive filter coefficients for reshaping the noise-distorted signal. The slicer maps the equalized signal to a sequence of constellation coordinates to recover the transmitted data. The slicer also feeds back error data (difference between an equalized coordinate and a defined coordinate) to the equalizer for updating the filter coefficients.

A problem with using such known systems in a frequency diverse environment is that the equalizer may include a 10–15 TAP complex FIR filter to equalize the signal and the error feed back loop in the equalizer may include additional filters of comparable complexity. The multipliers associated with these filters require significant hardware size and complexity. Therefore, simply replicating the equalizer and slicer for each of the sub bands in a frequency diverse environment would result in large and costly DSP circuitry.

Therefore, based on the industry recognized goals for size and cost reduction, what is needed is a receiver system and method for recovering data from a frequency diverse carrier that does not suffer the disadvantages of known systems.

SUMMARY OF THE INVENTION

A first aspect of the present invention is to provide a demodulation circuit comprising: a) an A/D converter generating a series of samples representing a frequency diverse modulated carrier including redundant data transmitted in a plurality of sub-spectra; b) a mixer receiving the series of samples and generating frequency shifted I-signal and a frequency shifted Q-signal representing redundant data in a plurality of frequency shifted sub-spectra; c) a filter bank including a plurality of narrow band filters, each centered at one of a plurality of the frequency shifted sub-spectra, each receiving the frequency shifted I-signal and the frequency shifted Q-signal, and each generating a sub-spectrum data signal comprising a sub spectrum I-signal and a sub-spectrum Q-signal; d) a selection circuit determining which one of the sub-spectrum data signals is the strongest sub-spectrum data signal; and e) a receiver circuit generating digital data in response to the strongest sub spectrum data signal.

In the preferred embodiment, the selection circuit operates by comparing a strength value of each sub-spectrum data signal to a strength value of at least one other of the sub-spectrum data signals and selecting the sub spectrum data signal with the greatest strength value to pass to the receiver. The strength value may represent the sum of the strength of a plurality of sample values in the sub-spectrum data signal. The sample values from the first sub-spectrum and the second sub-spectrum may be within a defined time window and the strength value may be equal to the sum of the square of each of an I sample value and a Q sample value occurring within the defined time window.

Further, the selection circuit may select a plurality of defined time windows within a transmission frame and select sub-spectrum with the largest strength value for each of the defined time windows to pass to the receiver to provide the receiver circuitry with the highness strength signal throughout the transmission frame. Further yet, the receiver may include an equalizer and a slicer for recovering quadrature amplitude modulated data from the sub-spectrum data signal. There may be three 2 Mhz sub-spectra centered at 5 Mhz, 7 Mhz, and 9 Mhz respectively.

A second aspect of the present invention is to provide a method of recovering data from a frequency diverse modulated carrier comprising: a) generating a series of digital samples representing redundant data transmitted in a plurality of sub-spectra of a frequency diverse modulated carrier; b) mixing the series of digital samples with a digital sine waveform and a digital cosine waveform to generate a frequency shifted I-signal and a frequency shifted Q-signal representing redundant data in a plurality of frequency shifted sub-spectra; c) filtering the frequency shifted I-signal and the frequency shifted Q-signal with a filter bank including a plurality of narrow band filters, each centered at one of a plurality of the frequency shifted sub-spectra to generate a plurality of sub-spectrum data signals, comprising a sub spectrum I-signal and a sub-spectrum Q-signal, each corresponding to one of the frequency shifted sub-spectra; d) determining which one of the sub-spectrum data signals is the strongest sub-spectrum data signal; and e) recovering digital data in response to the strongest sub spectrum data signal.

The step of determining which one of the sub-spectrum data signals is the strongest sub-spectrum data signal may include comparing a strength value of each sub-spectrum data signal to a strength value of at least one other of the sub-spectrum data signals and selecting the sub spectrum data signal with the greatest strength value. The strength value may represent the sum of the strength of a plurality of sample values in the sub-spectrum data signal. The sample values from the first sub-spectrum and the second sub-spectrum may be within a defined time window and the strength value may be equal to the sum of the square of each of an I sample value and a Q sample value occurring within the defined time window.

The method may further include determining which one of the sub-spectrum data signals is the strongest sub-spectrum data signal for a plurality of defined time windows within a transmission frame and selecting the sub-spectrum with the largest strength value for each of the defined time windows to provide the receiver circuitry with the highness strength signal throughout the transmission frame. Further, the method may include equalizing and slicing the sub-spectrum data signal with the highest strength to recover quadrature amplitude modulated data from the sub-spectrum data signal. There may be three 2 Mhz sub-spectra centered at 5 Mhz, 7 Mhz, and 9 Mhz respectively.

BRIEF DESCRIPTION OF THE DRAWINGS

FIG. 1 is a diagram of a 4-QAM encoding/decoding constellation useful for the practice of one embodiment of the present invention;

FIG. 2 is a frequency domain diagram of a frequency diverse redundant data signal;

FIG. 3 is a block diagram of a local area network in accordance with one embodiment of this invention;

DESCRIPTION OF THE PREFERRED EMBODIMENTS

Figure 4:
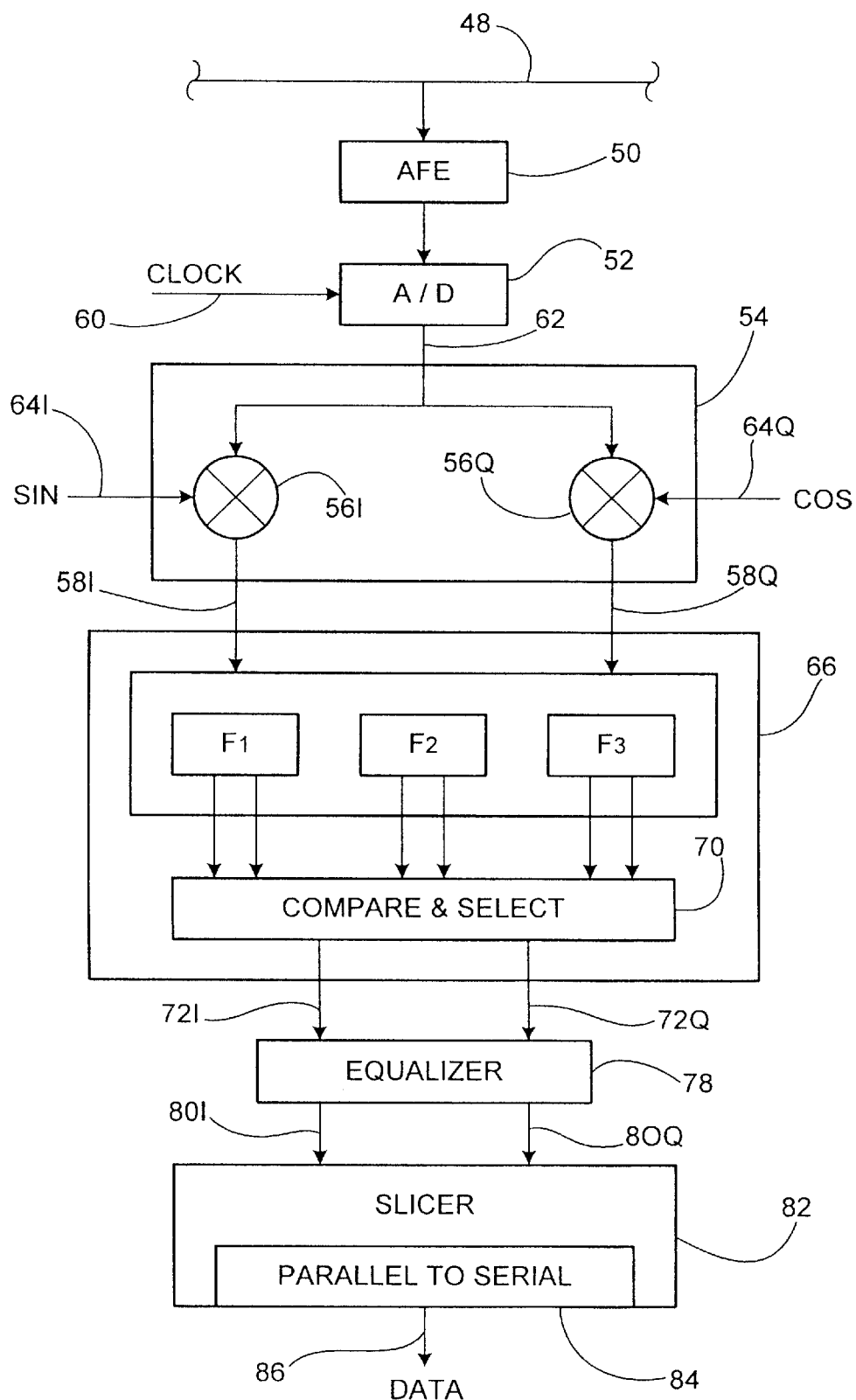
FIG. 4 is a block diagram of a receiver circuit in accordance with one embodiment of this invention.

The present invention will now be described in detail with reference to the drawings. In the drawings, like reference numerals are used to refer to like elements throughout.

FIG. 3 is a diagram of a local area network 40 implemented in a home environment using twisted pair network media according to an embodiment of this invention. The network 40 includes network stations 42(a)–42(c) that are connected to a telephone line (twisted pair) wiring 48 via RJ-41 phone jacks 44(a)–44(c) respectively. A telephone 46 is connected to an RJ-11 phone jack 44(d) and may continue to make telephone calls while network devices 42(a)–42(c) are communicating network data.

Each network device 42 may be a personal computer, printer, server, or other intelligent consumer device and each includes a transceiver 43(a)–43(c) respectively for communicating with other network devices 42(a)–42(c) via the network media 48.

Each of network devices 42(a)–42(c) communicates by transmitting an analog network signal comprising a carrier signal modulated with network data. A portion of network devices 42(a)–42(c) may utilize pulse position modulation (PPM) wherein network data is modulated on the carrier utilizing discrete band limited pulses. Another portion of network devices 42(a)–42(c) may selectively utilize PPM modulation or frequency diverse quadrature amplitude modulation (QAM) wherein network data is modulated on the carrier by varying both the amplitude and phase of the carrier in accordance with a complex encoding constellation in multiple sub bands. In the preferred embodiment, the PPM modulation adheres to the Home Phoneline Network Alliance (HPNA) 1.0 standard, as promulgated by a consortium of network equipment providers including Advance Micro Devices, Inc. of Sunnyvale, Calif., and provides for a 1 Mbit data rate and the frequency diverse QAM modulation adheres to the HPNA 2.0 standard and provides for a 10 Mbit data rate. As such, it should be appreciated that data communication between a networked device 42 which is only capable of PPM modulation and any other device will utilize a PPM modulated carrier. However, data communication between two devices that are capable of both PPM and frequency diverse QAM modulation will utilize the faster data rate of a frequency diverse QAM modulated carrier. Therefore, at the receiving network device, it should be appreciated that a transceiver 43(a)–43(c) capable of both PPM and frequency diverse QAM must be able to receive data utilizing both a PPM and a frequency diverse QAM modulated carrier.

Referring to FIG. 4, a block diagram of a receiver 45 for recovering data from a frequency diverse QAM carrier is shown. Analog front end 50 is coupled to the network wiring 48 and includes known analog circuits tuned to the modulated carrier frequency for receiving a carrier signal from the transmission medium and amplifying such signal to utilize the dynamic range of A/D converter 52.

In the preferred embodiment A/D converter 52 is a 10-bit A/D converter. The A/D converter 52 is driven by a sampling clock signal 60 with a frequency that is at least four-times that of a nominal frequency of the modulated carrier frequency. In the preferred embodiment, the nominal frequency of the modulated carrier is 7 Mhz and a 32 Mhz sampling frequency is chosen.

The output of the A/D converter 52 is a digitized carrier signal on line 62 comprising a sequence of 10-bit sample values at the 32 Mhz sample frequency. The digitized carrier signal on line 62 is input to a complex mixer 54 which operates to mix the digital sample values with a digital sine wave 64(I) in mixer 56(I) and a digital cosine wave 64(Q) (of the same frequency as the digital sine wave) in mixer 56(Q). The outputs on lines 58(I) and 58(Q) are thus a frequency shifted inphase (I) signal and a frequency shifted quadrature (Q) signal respectively. The frequency shift is equal to the frequency of the sine wave and the cosine wave. Because a sine wave with a frequency of one fourth of the sampling frequency can be digitally represented by a sequence of values comprising only plus/minus 1 and zero, in the preferred embodiment, the digital sine waveform and cosine waveform have a frequency of 8 Mhz to simplify the digital hardware for performing the mixing operation.

The frequency shifted I signal and Q signal on lines 58(I) and 58(Q) are input to a sub band selector 66. The sub-band selector 66 includes a bank of narrow band filters 68(a)–68(c), each of which passes a frequency band centered at one of the frequency shifted sub spectra while not passing frequencies outside of the sub-spectra. The output from each narrow band filter 68(a)–68(c) is input to signal strength comparator and selector 70. Signal strength comparator and selector 70 compares the signal strength in each sub spectra and selects the sub spectra with the most powerful signal for output on lines 72(I) and 72(Q) for equalizing and slicing for data recovery.

Equalizer 78 receives the baseband I signal and the baseband Q signal and utilizing an 11 TAP FIR filter with adaptive coefficients shapes the signals to accommodate for distortion in network 48. An equalized I signal and an equalized Q signal are output on lines 80(I) and 80(q) for data recovery in slicer 82.

Slicer 82 operates to map each combination of an I value from the I equalized I signal and a Q value from the equalized Q signal to a defined constellation coordinate and to look-up the payload encoded data associated with such defined coordinate to recover the transmitted data. A parallel to serial converter 84 sequences the recovered data for output on data line 86. Slicer 82 also generates a feedback signal on line 88 to equalizer 78 which represents the difference between the received constellation coordinate and the defined constellation coordinate to which it mapped. This difference represents the error between the equalized signal and the originally transmitted signal and, as discussed previously, is used by the equalizer 78 to select and update filter coefficients to more effectively equalize the signals received by the equalizer on lines 72(I) and 72(Q).

Figure 5:
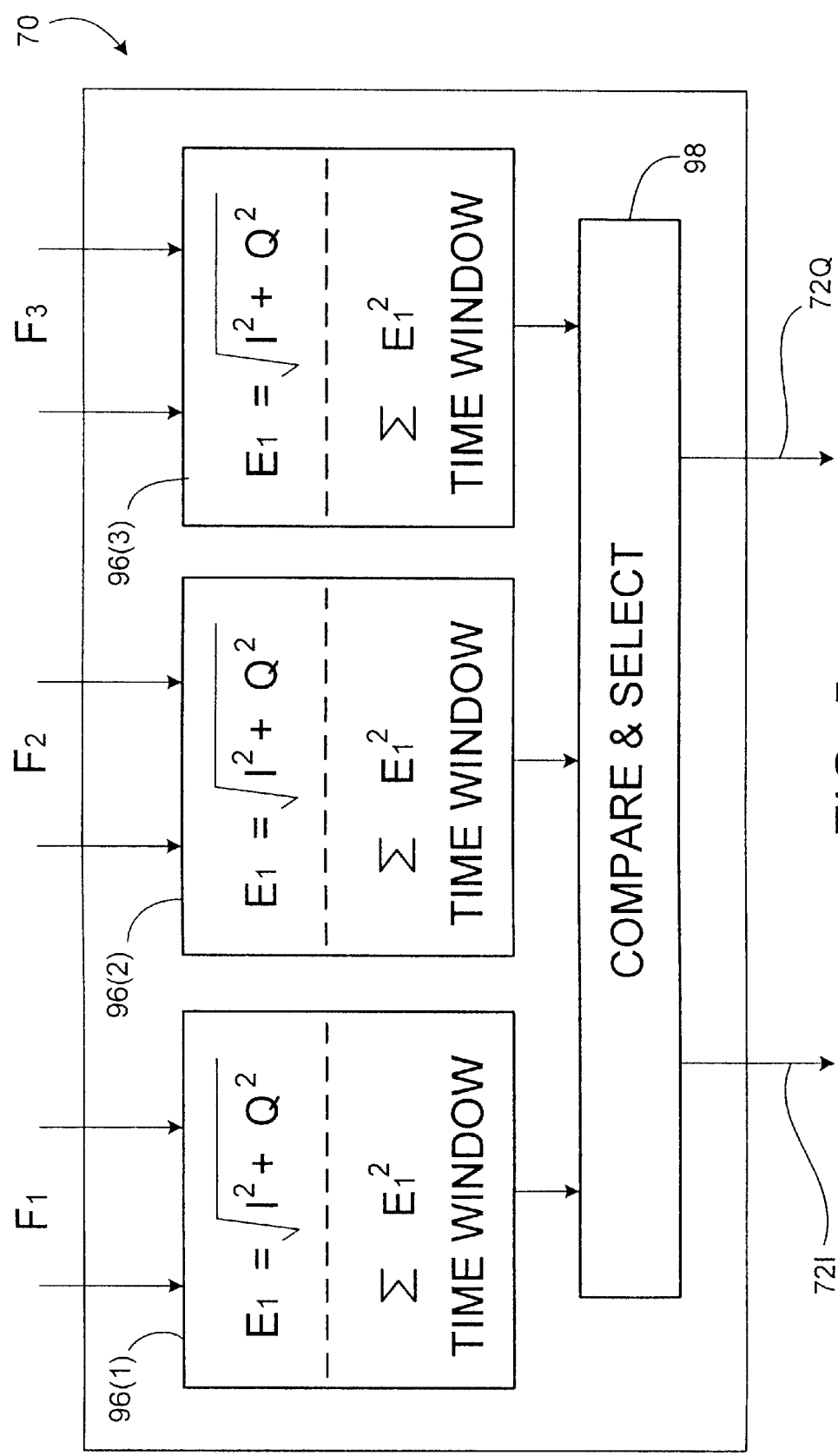
FIG. 5 is a block diagram of a strength comparison circuit in accordance with one embodiment of this invention.

Referring to FIG. 5 a more detailed block diagram of compare and select circuit 70 is shown. Circuit 70 receives an I and a Q signal from each of the narrow band filters F1, F2 and F3. To determine the strength of the signal in each sub-spectra, the circuit 70 calculates the energy of each sample value which is the square root of $I^2+Q^2$ and then sums the square of the energy of each sample value during a time window in each of circuits 96(1), 96(2) and 96(3) corresponding to the respective subbands. It should be appreciated that because the sum of the squares of the square roots of I2+Q2 is being calculated, the actual square root never needs to be calculated and the energy for each sub-spectra during the time window can simply be calculated by summing the squares of each I sample value and each Q sample value.

Figure 7A:
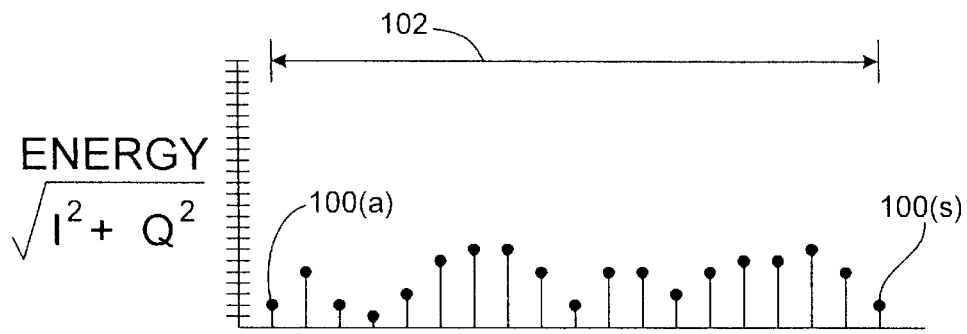
FIG. 7a is a time domain diagram of a digital signal.
Figure 7B:
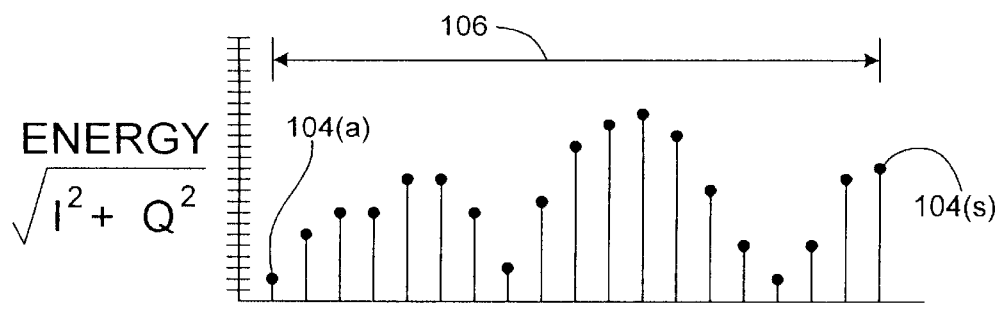
FIG. 7b is a time domain diagram of a digital signal.

For example, referring to FIG. 7a, a sequence of sample values 100(a)–100(s) is shown within a sample time window 102. Referring to FIG. 7b, a second sequence of sample values 104(a)–104(s) is shown within a sample time window 106. It should be appreciated that the sample values 104(a)–104(s) represent a stronger signal than the sample values 100(a)–100(s) as can be quantified by comparing the sum of the squares of sample values 100(a)–100(s) with the sum of the squares of sample values 104(a)–104(s).

Referring again to FIG. 5, comparison circuit 98 of compare and select circuit 70 receives the energy value from each circuit 96(1), 96(2), and 96(3) and selects the sub-spectra with the greatest energy value and couples the I and Q signal from that corresponding narrow band filter (e.g. F1, F2, or F3) to the equalizer 78 (FIG. 4) on lines 72(I) and 72(Q).

Figure 6:
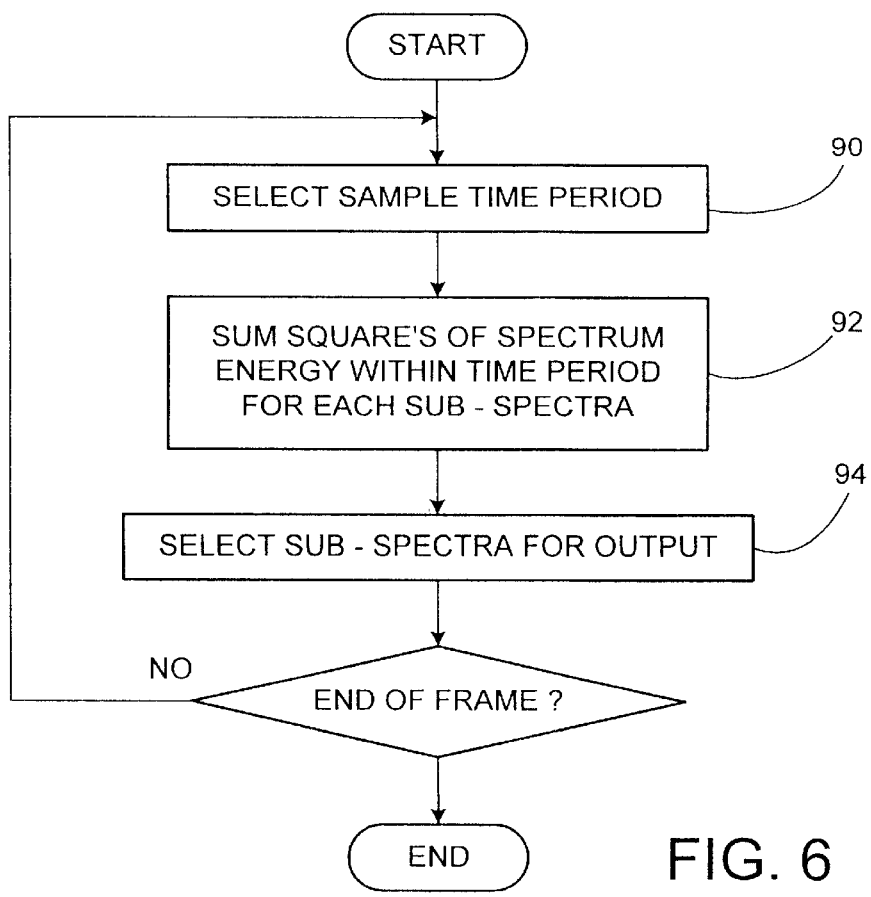
FIG. 6 is a flow chart showing exemplary operation of the circuit if FIG. 5.

Referring to FIG. 6, a flowchart of operation of the compare and select circuit 70 of FIG. 5 is shown. The circuit selects a sample time window in which to compare the signals from each filter representing the different sub-spectra at step 90. At step 92, for each sub spectra, the comparator squares each I sample value and Q sample value within the time window and sums the squares. At step 94 the comparator simply compares the sum of the square value from each sub spectra and selects the sub-spectra with the largest sum of the square value to be output to the equalizer 78 on lines 72(I) and 72(Q) (FIG. 4).

The above described systems and methods effectively select the strongest signal from a plurality of sub spectra in a frequency redundant data communication system. As such, the transmitted data can be recovered without redundant hardware in a receiver for separately recovering data from each sub-spectra. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A demodulation circuit comprising:
   a) an A/D converter generating a series of samples representing a frequency diverse modulated carrier including redundant data transmitted in a plurality of sub-spectra;
   b) a mixer receiving the series of samples and generating frequency shifted I-signal and a frequency shifted Q-signal representing redundant data in a plurality of frequency shifted sub-spectra;
   c) a filter bank including a plurality of narrow band filters, each centered at one of a plurality of the frequency shifted sub-spectra, each receiving the frequency shifted I-signal and the frequency shifted Q-signal, and each generating a sub-spectrum data signal comprising a sub spectrum I-signal and a sub-spectrum Q-signal;
   d) a selection circuit determining which one of the sub-spectrum data signals is the strongest sub-spectrum data signal; and
   e) a receiver circuit generating digital data in response to the strongest sub spectrum data signal.

2. The demodulation circuit of claim 1, wherein the selection circuit operates by comparing a strength value of each sub-spectrum data signal to a strength value of at least one other of the sub-spectrum data signals and selecting the sub spectrum data signal with the greatest strength value to pass to the receiver.

3. The demodulation circuit of claim 2, wherein the strength value represents the sum of the strength of a plurality of sample values in the sub-spectrum data signal.

4. The demodulation circuit of claim 3, wherein the plurality of sample values from the first sub-spectrum and the second sub-spectrum are within a defined time window.

5. The demodulation circuit of claim 4, wherein the strength value is equal to the sum of the square of each of an I sample value and a Q sample value occurring within the defined time window.

6. The demodulation circuit of claim 5, wherein the selection circuit selects a plurality of defined time windows within a transmission frame and selects sub-spectrum with the largest strength value for each of the defined time windows to pass to the receiver to provide the receiver circuitry with the highness strength signal throughout the transmission frame.

7. The demodulation circuit of claim 6, wherein the receiver includes an equalizer and a slicer for recovering quadrature amplitude modulated data from the sub-spectrum data signal.

8. The demodulation circuit of claim 7, wherein there are three 2 Mhz sub-spectra centered at 5 Mhz, 7 Mhz, and 9 Mhz respectively.

9. A method of recovering data from a frequency diverse modulated carrier comprising:
   a) generating a series of digital samples representing redundant data transmitted in a plurality of sub-spectra of a frequency diverse modulated carrier;
   b) mixing the series of digital samples with a digital sine waveform and a digital cosine waveform to generate a frequency shifted I-signal and a frequency shifted Q-signal representing redundant data in a plurality of frequency shifted sub-spectra;
   c) filtering the frequency shifted I-signal and the frequency shifted Q-signal with a filter bank including a plurality of narrow band filters, each centered at one of a plurality of the frequency shifted sub-spectra to generate a plurality of sub-spectrum data signals, comprising a sub spectrum I-signal and a sub-spectrum Q-signal, each corresponding to one of the frequency shifted sub-spectra;
   d) determining which one of the sub-spectrum data signals is the strongest sub-spectrum data signal; and
   e) recovering digital data in response to the strongest sub spectrum data signal.

10. The method of claim 9, wherein the step of determining which one of the sub-spectrum data signals is the strongest sub-spectrum data signal includes comparing a strength value of each sub-spectrum data signal to a strength value of at least one other of the sub-spectrum data signals and selecting the sub spectrum data signal with the greatest strength value.

11. The method of claim 10, wherein the strength value represents the sum of the strength of a plurality of sample values in the sub-spectrum data signal.

12. The method of claim 11, wherein the plurality of sample values from the first sub-spectrum and the second sub-spectrum are within a defined time window.

13. The method of claim 12, wherein the strength value is equal to the sum of the square of each of an I sample value and a Q sample value occurring within the defined time window.

14. The method of claim 13, further including determining which one of the sub-spectrum data signals is the strongest sub-spectrum data signal for a plurality of defined time windows within a transmission frame and selecting the sub-spectrum with the largest strength value for each of the defined time windows to provide the receiver circuitry with the highness strength signal throughout the transmission frame.

15. The method of claim 14, further including equalizing and slicing the sub-spectrum data signal with the highest strength to recover quadrature amplitude modulated data from the sub-spectrum data signal.

16. The method of claim 15, wherein there are three 2 Mhz sub-spectra centered at 5 Mhz, 7 Mhz, and 9 Mhz respectively.

* * * * *

UNITED STATES PATENT AND TRADEMARK OFFICE
CERTIFICATE OF CORRECTION

PATENT NO.    : 6,441,683 B1
DATED         : August 27, 2002
INVENTOR(S)   : Hwang et al.

It is certified that error appears in the above-identified patent and that said Letters Patent is hereby corrected as shown below:

Column 5,
Line 36, replace "(1)" with -- (l) --
Line 55, replace "72(1)" with -- 72(l) --

Column 6,
Line 17, replace "$1^2+Q^2$" with -- $l^2+Q^2$ --

Signed and Sealed this

Twenty-eighth Day of January, 2003

JAMES E. ROGAN
*Director of the United States Patent and Trademark Office*